US007890440B1

(12) United States Patent
Hardy

(10) Patent No.: US 7,890,440 B1
(45) Date of Patent: Feb. 15, 2011

(54) SYSTEMS AND METHODS FOR EVALUATING A GROUP DETECTION TOOL

(75) Inventor: William Christopher Hardy, Arlington, VA (US)

(73) Assignee: Science Applications International Corporation, San Diego, CA (US)

(*) Notice: Subject to any disclaimer, the term of this patent is extended or adjusted under 35 U.S.C. 154(b) by 1205 days.

(21) Appl. No.: 11/511,764

(22) Filed: Aug. 29, 2006

(51) Int. Cl.
*G06E 1/00* (2006.01)

(52) U.S. Cl. .................................................... 706/20

(58) Field of Classification Search ........ 706/20.45–47, 706/62; 705/319; 707/727, 728, 737, 739, 707/748
See application file for complete search history.

(56) References Cited

U.S. PATENT DOCUMENTS

| | | | |
|---|---|---|---|
| 6,725,259 | B1 | 4/2004 | Bharat ......................... 709/219 |
| 6,738,764 | B2 | 5/2004 | Mao et al. ...................... 707/5 |
| 6,904,428 | B2 | 6/2005 | Frieder et al. .................. 707/3 |
| 6,944,612 | B2 | 9/2005 | Roustant et al. ................ 707/3 |
| 6,963,867 | B2 | 11/2005 | Ford et al. ...................... 707/3 |
| 2002/0152208 | A1 | 10/2002 | Bloedorn ...................... 707/6 |
| 2005/0222929 | A1* | 10/2005 | Steier et al. ................... 705/35 |
| 2006/0271564 | A1* | 11/2006 | Meng Muntz et al. ....... 707/100 |

OTHER PUBLICATIONS

Carley, Dynamic Network Analysis, 2003, National Research Council, pp. 1-13.*
Krebs, Mapping Networks of Terrorist Cells, 2002, INSNA, pp. 1-10.*
Carley, et al., Revealing Soicial Structure from Texts: Meta-Matrix Text Analysis as a novel method for Network Text Analysis, 2005, Ideal Group Publishing, pp. 1-35.*
Kubica, Jeremy, et al., "Stochastic Link and Group Detection" [online], [retrieved on Nov. 16, 2006], 7 pp., Retrieved from the Internet.

(Continued)

*Primary Examiner*—David R Vincent
(74) *Attorney, Agent, or Firm*—King & Spalding LLP

(57) ABSTRACT

Systems and methods for evaluating a group detection tool are described. One described method includes a set of data including a collection of asserted links between pairs of individuals, creating a sorted list of the individuals present in the collection of asserted links, and creating a square co-occurrence matrix describing the collection of asserted links, the square co-occurrence matrix including a plurality of rows and a plurality of columns each containing the sorted list of individuals. The method also includes inserting a link indicator in each cell of the square co-occurrence matrix, the link indicator having a first value if a first individual associated with the row and a second individual associated with the column are linked and a second value if they are not, identifying a plurality of square sub-co-occurrence matrices in the square co-occurrence matrix, generating a statistic for a characteristic of at least one class of the plurality of square sub-co-occurrence matrices, and identifying one of the plurality of sub-co-occurrence matrices for each of the at least one class of square sub-co-occurrence matrices. The method further includes evaluating the performance of the group detection tool by: applying the group detection tool to the set of data, and determining the extent to which a plurality of individuals in the at least one square sub-co-occurrence matrix are associated in one or more groups generated by the group detection tool.

30 Claims, 7 Drawing Sheets

OTHER PUBLICATIONS

Pioch, Nicholas J., et al., "A Link and Group Analysis Toolkit (LGAT) for Intelligence Analysis" [online], [retrieved on Nov. 16, 2006], 6 pp., Retrieved from the Internet.
Kubica, Jeremy, et al., "Tractable Group Detection on Large Link Data Sets" [online], [retrieved on Nov. 16, 2006], 4 pp., Retrieved from the Internet.
Coffman, Thayne, et al., "Graph-Based Technologies for Intelligence Analysis," *Communications of the ACM*, vol. 47, No. 3, pp. 45-47, Mar. 2004.
Mukaiyama, Hiroshi, "Technical Aspect of Next Generation Digital Library Project" [online], [retrieved on Nov. 16, 2006], 14 pp., Retrieved from the Internet.
Adibi, Jafar, et al., "Measuring Confidence Intervals In Link Discovery: A Bootstrap Approach" [online], Aug. 22-25, 2004 [retrieved on Nov. 16, 2006], 10 pp., Retrieved from the Internet.
Lin, Shou-de, "Issues of Verification for Unsupervised Discovery Systems" [online], Aug. 22-25, 2004 [retrieved on Nov. 16, 2006], 8 pp., Retrieved from the Internet.
"The Link Analysis Workbench (LAW)" [online], [retrieved on Nov. 16, 2006], 2 pp., Retrieved from the Internet.
"Link Discovery: Issues, Approaches and Applications" [online], Aug. 21, 2005 [retrieved on Nov. 16, 2006], 1 p., Retrieved from the Internet.
Sterling, Greg, "Local Search: Missing Pieces Falling into Place" [online], Feb. 2, 2004 [retrieved on Nov. 16, 2006], 5 pp., Retrieved from the Internet.
Robb, Drew, "Text Mining Tools Take on Unstructured Data," *Computerworld*, 3 pp., Jun. 21, 2004.
D. Ferrucci, et al., "Building an Example Application With the Unstructured Information Management Architecture" [online], Sep. 2004 [retrieved on Nov. 16, 2006], 3 pp., Retrieved from the Internet.
Robb, Drew, "Getting the Bigger Picture: Dealing With Unstructured Data" [online], Sep. 13, 2004 [retrieved on Nov. 17, 2006], 4 pp., Retrieved from the Internet.
"Enterprise Search Tools" [online], Dec. 1, 2004 [retrieved on Nov. 16, 2006], 4pp., Retrieved from the Internet.
Arnold, Stephen, "Recent Trends in Enterprise Search" [online], Aug. 3, 2005 [retrieved on Nov. 16, 2006], 9 pp., Retrieved from the Internet.
"Search Engines and Portals—US" [online], Mar. 2005 [retrieved on Nov. 16, 2006], 6 pp., Retrieved from the Internet.
"Unstructured Information Management Architecture SDK" [online], Dec. 16, 2004 [retrieved on Nov. 16, 2006], 3 pp., Retrieved from the Internet.
"Yahoo Desktop Search" [online], Copyright 2005 [retrieved on Nov. 16, 2006], 2 pp., Retrieved from the Internet.
"Windows Desktop Search" [online], Copyright 2006 [retrieved on Nov. 16, 2006], 1 p., Retrieved from the Internet: http://www.microsoft.com/windows/desktopsearch/default.mspx.
"Recommind" [online], Copyright 2006 [retrieved on Nov. 16, 2006], 1 p., Retrieved from the Internet.
"Inxight—Find Information Faster on Your Desktop" [online], Copyright 2006 [retrieved on Nov. 16, 2006], 1 p., Retrieved from the Internet.
"Inxight Products" [online], Copyright 2006 [retrieved on Nov. 16, 2006], 2 pp., Retrieved from the Internet.
"About Google Desktop" [online], Update of Nov. 1, 2005 [retrieved on Nov. 17, 2006] 4 pp., Retrieved from the Internet.
"About Google Desktop" [online], Update of Nov. 3, 2005 [retrieved on Nov. 17, 2006], 4 pp., Retrieved from the Internet.
"About Google Desktop" [online], Update of Nov. 4, 2005 [retrieved on Nov. 17, 2006], 4 pp., Retrieved from the Internet.
"About Google Desktop" [online], Update of Nov. 5, 2005 [retrieved on Nov. 17, 2006], 4 pp., Retrieved from the Internet.
"About Google Desktop" [online], Update of Nov. 24, 2005 [retrieved on Nov. 17, 2006], 4 pp., Retrieved from the Internet.
"About Google Desktop" [online], Update of Nov. 25, 2005 [retrieved on Nov. 17, 2006], 4 pp., Retrieved from the Internet.
"About Google Desktop" [online], Update of Nov. 26, 2005 [retrieved on Nov. 17, 2006], 4 pp., Retrieved from the Internet.
"About Google Desktop" [online], Update of Nov. 27, 2005 [retrieved on Nov. 17, 2006], 4 pp., Retrieved from the Internet.
"About Google Desktop" [online], Update of Nov. 28, 2005 [retrieved on Nov. 17, 2006], 4 pp., Retrieved from the Internet.
"About Google Desktop" [online], Update of Nov. 29, 2005 [retrieved on Nov. 17, 2006], 4 pp., Retrieved from the Internet.
"About Google Desktop" [online], Update of Nov. 30, 2005 [retrieved on Nov. 17, 2006], 4 pp., Retrieved from the Internet.
"About Google Desktop" [online], Update of Nov. 30, 2005 [retrieved on Nov. 17, 2006], 4 pp., Retrieved from the Internet.
"About Google Desktop" [online], Update of Nov. 30, 2005 [retrieved on Nov. 17, 2006], 4 pp., Retrieved on the Internet.
"Verity Products" [online], Update of Nov. 1, 2005 [retrieved on Nov. 17, 2006], 2 pp., Retrieved from the Internet.
"Verity Products" [online], Update of Nov. 2, 2005 [retrieved on Nov. 17, 2006], 2 pp., Retrieved from the Internet.
"Verity Products" [online], Updated Nov. 4, 2005 [retrieved on Nov. 17, 2006], 2 pp., Retrieved from the Internet.
"Verity Products" [online], Updated Nov. 5, 2005 [retrieved on Nov. 17, 2006], 2 pp., Retrieved from the Internet.
"Verity Products" [online], Updated Nov. 6, 2005 [retrieved on Nov. 17, 2006], 2 pp., Retrieved from the Internet.
"Verity Products" [online], Updated Nov. 24, 2005 [retrieved on Nov. 17, 2006], 2 pp., Retrieved from the Internet.
"Verity Products" [online], Updated Nov. 25, 2005 [retrieved on Nov. 17, 2006], 2 pp., Retrieved from the Internet.
"Verity Products" [online], Updated Nov. 26, 2005 [retrieved on Nov. 17, 2006], 2 pp., Retrieved from the Internet.
"Verity Products" [online], Updated Nov. 27, 2005 [retrieved on Nov. 17, 2006], 2 pp., Retrieved from the Internet.
"Verity Products" [online], Updated Nov. 28, 2005 [retrieved on Nov. 17, 2006], 2 pp., Retrieved from the Internet.
"Verity Products" [online], Updated Nov. 28, 2005 [retrieved on Nov. 17, 2006], 2 pp., Retrieved from the Internet.
"Verity Products" [online], Updated Nov. 29, 2005 [retrieved on Nov. 17, 2006], 2 pp., Retrieved from the Internet.
"Verity Products" [online], Updated Nov. 30, 2005 [retrieved on Nov. 17, 2006], 2 pp., Retrieved from the Internet.
"SBIR Phase I: Quality-Based Knowledge Discovery for Information Retrieval in Large Organizations" [online], Copyright 2005 [retrieved on Nov. 17, 2006], 3 pp., Retrieved from the Internet.

* cited by examiner

|   | $G_1$ | $G_2$ | $G_3$ | $G_4$ | ... | $G_{NG}$ |
|---|---|---|---|---|---|---|
| $d_1$ | 1 | 1 | 0 | 0 | | 0 |
| $d_2$ | 0 | 0 | 1 | 0 | | 0 |
| $d_3$ | 1 | 0 | 0 | 0 | | 0 |
| $d_4$ | 0 | 0 | 0 | 1 | | 0 |
| ... | | | | | | |
| $d_{NP}$ | 0 | 0 | 1 | 0 | | 1 |

Figure 1

A
(Peg, Tom)
(Tim, Jim)
(Jim, Ira)
(Liz, Peg)
(Ron, Tim)
(Tim, Peg)
(Jim, Tim)
(Liz, Tim)
(Liz, Bob)
(Sue, Ira)
(Ron, Peg)
(Tim, Sue)

Nms
Peg
Tim
Jim
Liz
Ron
Sue
Tom
Ira
Bob

P
1: Bob
2: Ira
3: Jim
4: Liz
5: Peg
6: Ron
7: Sue
8: Tim
9: Tom $\underline{M_A}$ $$\begin{pmatrix} 0 & 0 & 0 & 0 & 0 & 1 & 0 & 0 & 1 \\ 0 & 0 & 1 & 1 & 1 & 1 & 1 & 1 & 0 \\ 0 & 1 & 0 & 0 & 0 & 0 & 1 & 1 & 0 \\ 0 & 0 & 0 & 0 & 1 & 1 & 0 & 1 & 0 \\ 0 & 0 & 0 & 1 & 1 & 1 & 0 & 1 & 1 \\ 1 & 0 & 0 & 1 & 1 & 0 & 0 & 1 & 0 \\ 0 & 1 & 1 & 0 & 0 & 0 & 0 & 1 & 0 \\ 1 & 1 & 1 & 0 & 0 & 1 & 1 & 0 & 0 \\ 1 & 0 & 0 & 1 & 0 & 0 & 0 & 0 & 0 \end{pmatrix}$$

Figure 3

| i =      | 1   | 2   | 3   | 4   | 5   | 6   | 7   | 8   | 9   |
|----------|-----|-----|-----|-----|-----|-----|-----|-----|-----|
| JX[i] =  | 112 | 292 | 387 | 492 | 503 | 512 | 713 | 781 | 947 |

|     | 1 | 2 | 3 | 4 | 5 | 6 | 7 | 8 | 9 |
|-----|---|---|---|---|---|---|---|---|---|
| 1:  | 1 | 1 | 1 | 1 | 1 | 1 | 1 | 1 | 1 |
| 2:  | 1 | 1 | 0 | 1 | 1 | 0 | 1 | 0 | 1 |
| 3:  | 1 | 0 | 1 | 0 | 1 | 0 | 1 | 1 | 0 |
| 4:  | 1 | 1 | 0 | 1 | 1 | 0 | 1 | 1 | 0 |
| 5:  | 1 | 1 | 1 | 1 | 1 | 1 | 1 | 1 | 1 |
| 6:  | 1 | 1 | 0 | 0 | 1 | 1 | 0 | 0 | 1 |
| 7:  | 1 | 0 | 1 | 1 | 0 | 0 | 1 | 1 | 0 |
| 8:  | 1 | 0 | 1 | 1 | 0 | 0 | 1 | 1 | 0 |
| 9:  | 1 | 1 | 0 | 0 | 1 | 1 | 0 | 0 | 1 |

|     | 8 | 7 | 3 | 4 | 1 | 6 | 2 | 5 | 9 |
|-----|---|---|---|---|---|---|---|---|---|
| 8:  | 1 | 1 | 1 | 1 | 1 | 0 | 0 | 0 | 0 |
| 7:  | 1 | 1 | 1 | 1 | 1 | 0 | 0 | 0 | 0 |
| 3:  | 1 | 1 | 1 | 1 | 1 | 0 | 0 | 0 | 0 |
| 4:  | 1 | 1 | 1 | 1 | 1 | 0 | 0 | 0 | 0 |
| 1:  | 1 | 1 | 1 | 1 | 1 | 1 | 1 | 1 | 1 |
| 6:  | 0 | 0 | 0 | 0 | 1 | 1 | 1 | 1 | 1 |
| 2:  | 0 | 0 | 0 | 0 | 1 | 1 | 1 | 1 | 1 |
| 5:  | 0 | 0 | 0 | 0 | 1 | 1 | 1 | 1 | 1 |
| 9:  | 0 | 0 | 0 | 0 | 1 | 1 | 1 | 1 | 1 |

Column Sum Threshold for 9 x 9 sub co-occurrence matrix: 4

Figure 5

SYSTEMS AND METHODS FOR EVALUATING A GROUP DETECTION TOOL

STATEMENT REGARDING FEDERALLY SPONSORED RESEARCH OR DEVELOPMENT

Embodiments of the invention may have been conceived or first actually reduced to practice in the performance of work under the following Government contract: MDA972-03-9-0001, Research & Development Experimental Collaboration System (RDEC). As a result, the Government may have certain rights in those inventions.

FIELD OF THE INVENTION

The present invention relates generally to methods and systems for performing detection of groups. The present invention relates particularly to systems and methods for evaluating a group detection tool.

BACKGROUND

A group detection tool ("GDT") is a mathematical routine applied to data describing known associations among individuals to detect clusters of persons who are likely to be involved in pursuit of a common goal or interest, to share a communicable disease, or to otherwise be involved together in a way that suggests more than a casual relationship. A GDT may detect clusters of people, diseases, biomedical events, fraud and terrorist cells where there is a common goal, interest or other observable common threads or co-occurrence. The efficacy of such a tool may be gauged, at least in part, by measures of:

1) Delineation accuracy, showing how much difference there is between groups inferred by application of a GDT and their real-world counter-parts; and
2) Inference utility, describing the accuracy and reliability of inferences as to allegiances or interests of individuals derived from analysis of groups identified by a GDT.

The magnitude of the problem of defining quantifiers for such measures to support evaluation of GDTs depends on the availability of information on the existence and composition of groups. Given information on the composition of real-world groups, quantifiers for measures of delineation accuracy and interpretability can be readily defined in terms of differences between the membership of known groups and the ones identified with the GDT. Absent any information on real-world groups, however, there is no basis for determining such differences. In this case efficacy of a GDT must be inferred from statistics that can be derived and interpreted without any knowledge of actual groups or assumptions as to their likely effects on known associations.

SUMMARY

Summary of the Problem

Referring to the Description of the Related Art, a need exists for an algorithm to provide a basis for evaluating GDTs without knowledge regarding the composition of real-world groups to which persons in the observed population might belong.

Summary of the Solution

Embodiments of the present invention provide systems and methods for evaluating a group detection tool.

One embodiment comprises a method for evaluating a group detection tool including receiving a set of data comprising a collection of asserted links between pairs of individuals, creating a sorted list of the individuals present in the collection of asserted links, and creating a square co-occurrence matrix describing the collection of asserted links, the square co-occurrence matrix comprising a plurality of rows and a plurality of columns each containing the sorted list of individuals. The method also includes inserting a link indicator in each cell of the square co-occurrence matrix, the link indicator having a first value if a first individual associated with the row and a second individual associated with the column are linked and a second value if they are not, identifying a plurality of square sub-co-occurrence matrices in the square co-occurrence matrix, generating a statistic for a characteristic of at least one class of the plurality of square sub-co-occurrence matrices, and identifying one of the plurality of sub-co-occurrence matrices for each of the at least one class of square sub-co-occurrence matrices. The method further includes evaluating the performance of the group detection tool by: applying the group detection tool to the set of data, and determining the extent to which a plurality of individuals in the at least one square sub-co-occurrence matrix are associated in one or more groups generated by the group detection tool.

In another embodiment, a computer-readable medium (such as, for example random access memory or a computer disk) comprises code for carrying out such a method.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIG. 1 is a matrix illustrating one method according to an embodiment of the present invention of describing the membership of known groups in which a member of a population is shown to be a member of a group identified by the presense of a link indicator in the column opposite the row for that member;

FIG. 3 is a chart illustrating a process of creating a co-occurrence matrix for a small set of individuals in one embodiment of the present invention;

FIG. 5 is a chart illustrating co-occurrence matrices comprising a combination of smaller, more tightly associated clusters in one embodiment of the present invention;

DETAILED DESCRIPTION

Figure 2:
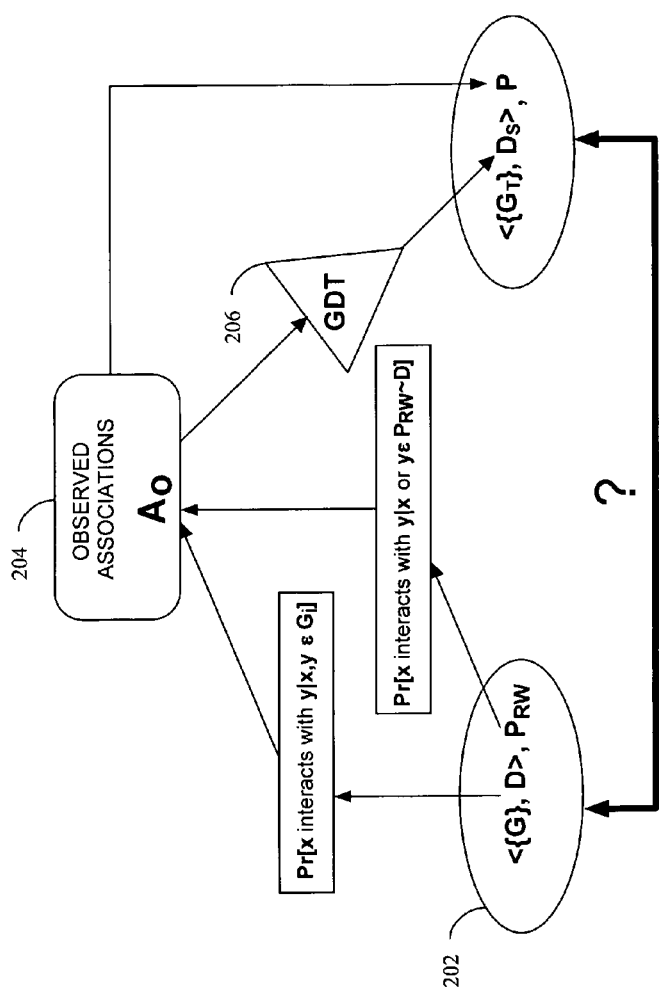
FIG. 2 is a block diagram illustrating application of a GDT to a family of groups and describing the question of how well the GDT has delineated them in one embodiment of the present invention.

Embodiments of the present invention provide systems and methods for evaluating a group detection tool ("GDT"). One embodiment of the present invention comprises an algorithm to provide a basis for evaluating group detection tools ("GDTs") without knowledge of the composition of real-world groups to which persons in the observed population might belong. The algorithm is based on statistics that can be derived directly from the association data processed by a GDT. The statistics derived are then used to identify clusters of persons whose known associations exhibit patterns that would represent statistically "rare events" were there no impetus for their occurrence. Such clusters indicate that interactions between the persons are stimulated by pursuit of a common goal or interest.

This example is given to introduce the reader to the general subject matter discussed. The invention is not limited to this example.

The following description is presented in three major sections.

The first section is entitled "FOUNDATIONS" and describes perspectives on the group detection problem, the structure and function of GDTs, and the objectives of evaluating the efficacy of GDTs that led to the development of embodiments of the present invention. One such embodiment is referred to herein as the "N-Algorithm." While the N-Algorithm comprises one embodiment of the present invention, the invention is not limited to the N-Algorithm embodiment.

The second section is entitled "N-ALGORITHM" and describes the general structure of one algorithm according to one embodiment of the present invention and illustrates how the algorithm performs to create a basis for assessing "inherent groupness" of collections of individuals.

And the third section is entitled "APPLICATIONS" and illustrates the application of the N-Algorithm embodiment to the problem of evaluation of GDTs absent any information about the existence or composition of groups reflected in the association data and briefly describes other possible uses of the tool.

Foundations

One embodiment of a group detection tool according to the present invention is described herein as the N-Algorithm. The 'N' in the name stands for "number of associates" which is the independent variable that defines the test statistic. However, 'N' here can as easily be thought of a standing for "null", "natural", "naive", or any other adjective beginning with 'n' that connotes something very basic and simple, because the algorithm is predicated on the following simple concepts and models.

DEFINITIONS

In simplest terms, a group is a collection of individuals whose interactions are stimulated by pursuit of a common goal or interest. The objective of group detection is to infer from data describing observed inter-personal interactions those individuals who are likely to be members of a group. The raw data from which the inferences as to likely group membership are derived by a GDT are: (a) a collection of individuals, referred to herein as the observed population; and (b) information describing known or observed relationships among those individuals. The observed relationships are sometimes referred to in the literature as links. As used herein, however, the relationships represented in the data are referred to as associations, which are links, or bonds inferred from a combination of links, strong enough to suggest the likelihood of exchanges of information between the persons linked.

Data Representation

The raw data from which the inferences as to likely group membership is derived, then, comprises a collection of known associations among named individuals from the observed population. For ease of reference, the observed population is denoted P, and understood to be defined by $P=\{x_i: i=1, \ldots, Np\}$, where the x's denote the names, or indices in a list of names, of a total of Np persons for whom there is association data.

The association data comprises a set, A, of pairs of individuals $(x_i, x_j)$, whose presence in A means "there is a known association between $x_i$ and $x_j$.". The information content of A is represented by the Np×Np co-occurrence matrix $M_A$ defined by:

$$M_A[i,j] = \begin{cases} 1 \text{ if } i=j \\ 1 \text{ if } (x_i, x_j) \text{ or } (x_j, x_i) \text{ is in } A \\ 0 \text{ otherwise.} \end{cases} \quad \text{(E-1)}$$

The co-occurrence matrices described herein therefore have 1's on the diagonal and entries that are symmetric about the diagonal. This means that the associations in A are assumed to be relationships that are, in mathematical terms, reflexive $[(x_i,x_i) \in A$ for all $x_i, \in P]$, and symmetric $[(x_i,x_j) \in A$ implies $(x_j,x_i) \in A]$.

Group Structures

The composition of any collection of groups, either known, or generated by a GDT, is described as a group structure, which is a mathematical description of a group embedded in an observed population, P, comprising:
- $\{G_k: k=1, \ldots, NG\}$ a set of NG distinct groups in P;
- a domain, $D=\{d_x: x=1, \ldots, Nd\}$, comprising the indices in P of Nd persons who are identified as members of at least one of the groups in $\{G\}$; and
- an Nd×NG 0, 1 membership matrix of the form shown in FIG. 1, in which elements of the matrix are set to 1 in the appropriate positions to signify that the member of D is a member of the group identified in with each column.

The Group Delineation Problem

FIG. 2 describes the basic group delineation problem in terms of the representations of data just introduced. In the illustration of the problem shown in FIG. 2, a real-world group structure $<\{G\}, D>$ 202 is embedded in a real-world population $P_{RW}$. The nature of the general population determines a likelihood of occurrence of observable associations that are not associated with activities of one of the groups in $\{G\}$. These associations are augmented by other associations that occur among members of the various groups in $\{G\}$, as they interact in pursuit of their common interests or goals. At some point the population $P_{RW}$ is observed to produce a set of associations $A_O$ 204. The subset of $P_{RW}$, comprising the persons whose associations were actually observed, then defines the observed population, P. In an attempt to understand the real-world group structure, a GDT is applied to $A_O$ 204, to produce an inferred group structure, $<\{G_T\}, D_S>$ 206, which is analyzed to infer likely pursuit of interests or goals among persons in the observed population, P.

The GDT Evaluation Problem

As suggested by the large question mark in FIG. 2, the central question in evaluating the efficacy and utility of a GDT is the relationship between $<\{G\}, D>$, $P_{RW}$, which are the source of $A_O$, and $<\{G_T\}, D_S>$, P, produced by the GDT. When at least some elements of $<\{G\}, D>$ are known, the problem devolves to one of defining measures of differences between the known elements of the real-world group structure and that generated by the GDT. Absent such information, however, we will have only the information on the right side of FIG. 2 and nothing from the left for comparison. This impasse creates the need for some basis for determining, in the absence of any knowledge of actual groups:
  (a) when a group in {GT} can reasonably be inferred to represent a collection of individuals, each of whom has a high probability of being in a real-world group with the others; and
  (b) the confidence that can be ascribed to an inference about x predicated on the assumption that x is a member of some discovered group $\{G_T\}$ implies x is a member of some real-world group {G}.

The N-Algorithm

The N-Algorithm described herein provides a means of handling the GDT evaluation problem when nothing is known about the real-world group structure. In other words, the N-Algorithm performs an evaluation without any knowledge of the ground truths, thereby performing a "blind" evaluation of the GDT. The N-Algorithm addresses the problem by processing co-occurrence matrices of the form described in equations (E-1) to identify sub-matrices exhibiting patterns of association that would not be expected, unless the persons defining the sub-matrix were members of the same real-world group. The procedure of doing this is predicated on the simple principle that:

The incidence of observed associations between two members of one of the groups in {G} can be expected to be significantly higher than that between two persons, at least one of whom is not in the group.

The reason for this expectation is immediately suggested in FIG. 2, which shows that membership in a group in {G} will add to the probabilities of observing associations stimulated by the pursuit of the common goal or interest of the group. This implies that, to the extent that the association data captured in $A_O$ represents an adequate sample of real-world associations, the membership in groups should be detectable by application of direct statistical tests to determine when there is a statistically significant difference in the incidence of associations among a subset of P.

The procedure developed for accomplishing this detection comprises the N-Algorithm, one embodiment of which is described below as a series of processing steps. The description in each case begins with a discussion of the objective and execution of the step. The narrative is then followed by a description of one of possibly many alternative processes that will readily achieve the desired objective.

Step 1

Create and Describe a Set of Associations

The first step in applying the N-Algorithm in one embodiment of the present invention is to qualify available data on links among individuals to create a set of validated associations, A. This is the classical starting point for any group identification problem. What should be emphasized here, however, is that the pairs included in the set A are defined by criteria that assure satisfaction of two conditions:
  (1) Both members of any pair in A are individuals.
  (2) The relationships defining the associations can reasonably be interpreted to imply a high probability of the opportunity for exchanges of information between the two persons.

The first condition here is at variance with many models on which extant group detection tools are based, in which the links recorded can include, in addition to persons, such things as telephone numbers called, particular events, geographical regions, familial relationships, etc. It is not necessarily inconsistent with such models, however, because identification of group membership will at some point require the joint interpretation of those other kinds of links to determine whether the observed data substantiates inference of a bond between two persons. Thus, even though it may not be readily visible, the group identification algorithm embedded in any GDT must ultimately operate on data describing relationships between persons, rather than other kinds of links.

The second condition is stipulated as a means of assuring that the relationships reflected in the association data are semantically meaningful, in the sense that they represent something that might reasonably have been stimulated by pursuit of a common goal or interest, as well as chance encounters. In concrete terms, it means, for example, that unless the two persons were observed to have traveled to the stadium together or sat close to each other, the relationship "attended the same football game" would not be a meaningful association, even though it evinces a common interest in football. Similarly, "called the same telephone number" would not be an association, unless the telephone number was that for an individual, rather than a commercial number likely to be called by anyone. Moreover, in the case the number were for an individual, the associations represented would be between the callers and the individual called, rather than the callers.

The mathematical description of a set of associations, A, satisfying these conditions used in one embodiment of the N-Algorithm is co-occurrence matrix $M_A$ of the form described in equations (E-1). Specifically, the co-occurrence matrix is created as follows:

(1) Assume A to comprise a list of pairs of names of individuals. The first step is to determine and index the population P associated with A. This is accomplished by creating a single list of names comprising all the names of first members of pairs in A concatenated with all the names of second members, and then eliminating all duplicates, to produce the set:

Nms={all unique occurrences of names in A}.

Then, if Nms contains Np names, the indexed observed population, P becomes:

$P=\{Nms(i): i=1, \ldots, Np\}$.

(2) The Np×Np matrix $M_A$ is then created as by setting:

$$M_A[i, j] = \begin{array}{l} 1 \text{ if } i = j \\ 1 \text{ if } (Nms(i), Nms(j)) \text{ or } (Nms(j), Nms(i)) \text{ is in } A \\ 0 \text{ otherwise.} \end{array}$$

This process is illustrated for a small set A in FIG. 3.

Step 2

Determine Column Sum Statistics for Co-Occurrence Sub-Matrices of $M_A$

The hypothesis on which various embodiments of the N-Algorithm described herein are based is that the addition of the inter-group interactions to normal, extra-group interactions suggested earlier in FIG. 2 will create statistically significant patterns of associations among group members. In one embodiment, the test statistic examined for detecting such differences is the distribution of column sums for co-occurrence sub-matrices of $M_A$. Other statistics may be used in other embodiments of the present invention. For this embodiment, column sums may be generated as follows.

Any sub-matrix of a matrix M, $M_s$, can be described setting:

$$M_S[i,j]=M[\alpha(i),\beta(j)]$$

where α and β are sub-sets of the row and column indices of M, respectively, indexed by i and j. The sub-matrices of $M_A$ processed by the N-Algorithm are sub-co-occurrence matrices, which are of the form $M_A[\alpha, \alpha]$ representing the co-occurrence matrix for the sub-set, α, of indices of members of P. Thus, for example, setting α={1, 4, 6} for the sample $M_A$ shown in FIG. 3 yields the 3×3 sub-co-occurrence matrix:

$$\begin{matrix} 1 & 1 & 0 \\ 1 & 1 & 0 \\ 0 & 0 & 1 \end{matrix} = M_A \begin{bmatrix} (1,1) & (1,4) & (1,6) \\ (4,1) & (4,4) & (4,6) \\ (6,1) & (6,4) & (6,6) \end{bmatrix} \quad \text{(E-2)}$$

In one embodiment of the present invention, the test statistic used by the N-Algorithm is distributions of values of sums of columns of co-occurrence sub-matrices of $M_A$ like the one shown in (E-2). That particular 3×3 matrix, for example, yields the three data points—2, 2, and 1. Similar data points are generated and collected for n×n sub-matrices of $M_A$ to produce stable test statistics for use in the N-Algorithm. This is accomplished by generating random sub-sets of n indices of P, creating the associated sub-co-occurrence matrices, and summing the columns of each, to produce n samples of column sums. Repetition of the process for a large number of randomly selected sub-sets of indices of P for any value of n then yields sufficient sample sizes to create a family of cumulative distribution functions (CDFs):

$$F_A[n,k]=Pr[(\text{the column sum in an n×n co-occurrence sub-matrix of } M_A) \leq k]. \quad \text{(E-3)}$$

Table I displays values from several CDFs of this kind for a set of incidental associations, A, that are not augmented by the interactions associated with membership in a group. As seen there, the likelihood of seeing a particular column sums tails off rapidly as the sum approaches the maximum possible value of n, and the probability of seeing a value greater than k tends to drops below 1 in a thousand when k is much smaller than n. These results suggests, then, that given the data on associations in A, column sums greater than 2 in a 5×5 sub-co-occurrence matrix, 3 in a 10×10 sub-co-occurrence matrix, 3 in a 20×20 sub-co-occurrence matrix, or 5 in a 50×50 sub-co-occurrence matrix extracted from $M_A$ would represent extremely rare events.

Figure 4:
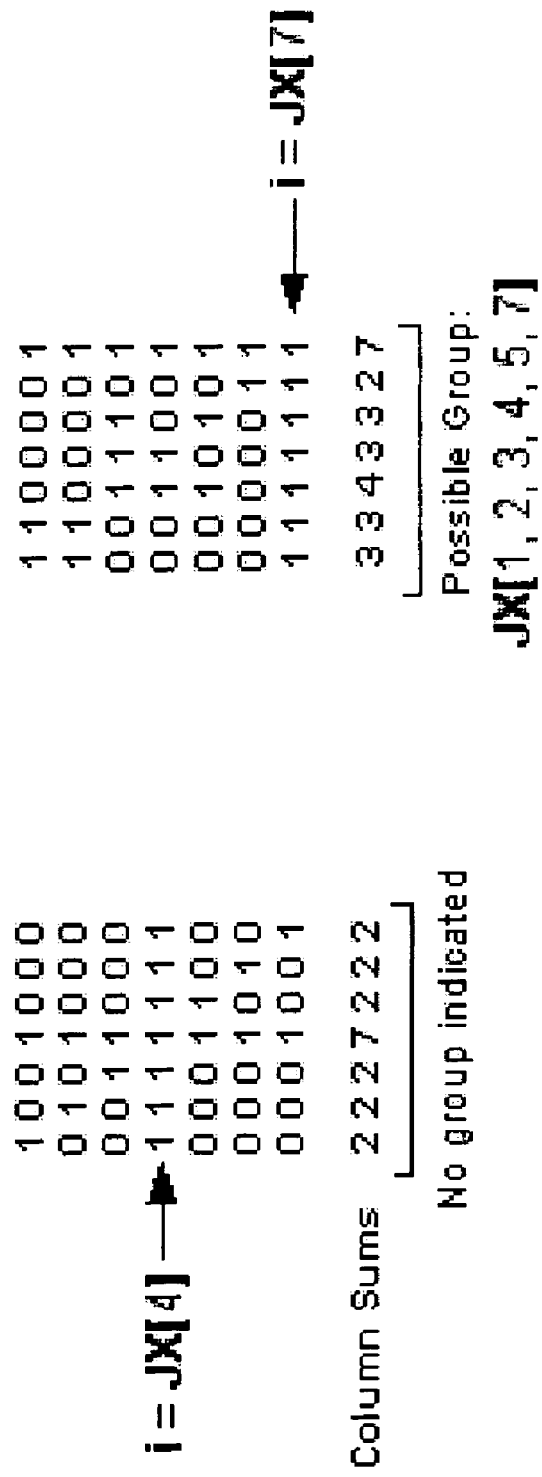
FIG. 4 is a chart illustrating sub-co-occurrence matrices in one embodiment of the present invention.

Note, moreover, that the CDFs shown in (E-3), and thus the threshold values for statistically significant values of column sums, depend only on the probabilities of observing different kinds of associations reflected in the data A. These test statistics therefore satisfy the criterion that they can be calculated without of any knowledge of, or assumptions about, the existence of groups in the observed population, P. In fact, the data set A from which the results shown in FIG. 4 were derived reflects the presence of 10 groups varying in size from 3 to 11 members embedded in an observed population of 1225 persons.

TABLE I

Examples of CDFs Derived from 100,000 Random Samples of Sub-Co-Occurrence Matrices

| Column Sum, k = : | Matrix Size | | | | | | | |
|---|---|---|---|---|---|---|---|---|
| | 5 × 5 | | 10 × 10 | | 20 × 20 | | 50 × 50 | |
| | Number | FA[n,k] | Number | FA[n,k] | Number | FA[n,k] | Number | FA[n,k] |
| 1 | 98624 | .986 | 97352 | .974 | 94582 | .946 | 87323 | .873 |
| 2 | 1354 | .99978 | 2534 | .9989 | 4948 | .995 | 10646 | .980 |
| 3 | 22 | 1.0 | 107 | .99993 | 418 | .99948 | 1480 | .994 |
| 4 | — | | 6 | .99999 | 48 | .99996 | 407 | .9986 |
| 5 | — | | 1 | 1.0 | 4 | 1.0 | 112 | .99968 |
| 6 | — | | — | | — | | 28 | .99996 |
| 7 | — | | — | | — | | 1 | .99997 |
| 8 | — | | — | | — | | 3 | 1.0 |

Step 3

Identify Candidate Clusters

The column sum statistics developed in Step 2 become, then, the basis for testing sub-co-occurrence matrices for evidence of "inherent groupness" to identify sets of persons likely to belong to a group. This is accomplished by a search for clusters of individuals satisfying criteria for statistical significance of their pattern of association. In one embodiment, the N-Algorithm conducts this search implementing a process whereby:

Each member of the observed population is examined in turn to create a sub-co-occurrence matrix that would reflect any groups to which the member belonged; and Tests of column sums are used to detect evidence of group membership in the test matrix.

This search produces the set of all sub-co-occurrence matrices that might reflect a set of group members. It is executed by the following routine.

As before, $M_A$ is the co-occurrence matrix for the set of associations A, in an observed population P. Let IX= {i=1, ..., Np} represent a set of indices for the observed population, P. Then for each index, i∈IX:

(1) Determine the set of indices JX={j: $M_A[i,j]=1$}. Because of the way that $M_A$ is defined, indices in JX will comprise those for persons in P who are shown to be associates of i in A, plus i itself, since $M_A$ has 1's on the diagonal.

(2) Extract the sub-co-occurrence matrix $M_A[JX,JX]$. This produces square matrices like those illustrated in FIG. 4, which contain 1's on the diagonal, at least one row of all 1's, corresponding to the row for i, and at least one column of all 1's, symmetric about the diagonal to the row for i. Note that when the number of elements in JX is nj the size this matrix is nj×nj.

(3) Calculate the column sums in $M_A[JX,JX]$, to get the indexed set of values $\{S(k): k=1, \ldots, nj\}$. Use the CDF values $F_A[nj,S(k)]$ defined in equation (3) in Step 2 to determine TK, the set indices from $\{k=1, \ldots, nj\}$ for which $S(k)$ satisfies the threshold criterion:

$$(1-F_A[nj,S(k)]) < 0.001. \quad (E-4)$$

While the threshold criterion in the example above is set to 0.001, i.e., one chance in a thousand, in other embodiments, the threshold may be set at different levels, e.g., the threshold may be set to 0.005, 0.01, 0.05, etc., depending on the level of confidence in the accuracy of the evaluation of the GDT desired by the user.

The set of indices $R_i = \{JX(k): k \in TK\}$ is then the set of indices of all persons in P whose pattern of associations with i violates the hypothesis that the associations in A are the result of incidental contacts among the members of P, with the confidence level set by (E-4).

Step 4

Adjust Output

The output from Step 3, then, is a collection of sets of indices identifying clusters of individuals in the observed population, P, whose patterns of observed associations in A cannot be attributed to incidental associations in P, and can, therefore, reasonably be inferred to comprise a group, or some sub-set of a group. This collection is referred to herein as the candidate cluster set from Step 3, and denoted CCS.

Since its members were generated by checking the sub-co-occurrence matrix of associates for each member of P in turn, CCS is likely to contain redundant information in the form of duplicates or sets of persons all of whom are contained in a larger collection. The final step in implementing the N-Algorithm is, then, is to adjust the collection CCS to eliminate redundancies.

TABLE II

Typical Results of Determination of CCS = $\{R_i\}$

| i: | $R_i$: | No. elements in $R_i$ |
|---|---|---|
| 1 | 60, 185, 332, 473, 708, 737, 822, 984, 1082, 1141, 1145, 1195 | 12 |
| 2 | 112, 292, 387, 492, 503, 512, 713, 781, 947 | 9 |
| 3 | 466, 507, 530, 587, 704 | 5 |
| 4 | 127, 208, 419, 783, 1069 | 5 |
| 5 | 112, 387, 492, 713, 781 | 5 |
| 6 | 380, 855, 961, 981, 1038, 1059, 1144 | 7 |
| 7 | 127, 208, 419, 783, 1069 | 5 |
| 8 | 112, 292, 503, 512, 947 | 5 |
| 9 | 22, 23, 77, 150, 400, 478, 535, 697, 724, 975 | 10 |

Number of Elements in CCS=9

In one embodiment, CCS is assumed to be represented by lists of indices of members of P like those shown in the second column of Table II on the previous page, and CCS is set equal to $\{R_i\}$, where $R_i$ is the set of indices of members of P in the $i^{th}$ row of such a display. The essential adjustments of CCSs like those shown in Table II are defined and accomplished by applying the following four corrections:

(1) Remove any 3-element members of CCS. When a person is directly associated with exactly two others in a population, there are only two possible forms of the sub co-occurrence matrix for that person:

```
1 1 1       1 1 1
1 1 0  or   1 1 1
1 0 1       1 1 1
```

The column sum threshold for a "rare" event will therefore always be 3, even when the incidence of column sums of 3 is much greater than 0.1%. This means that any R, in CCS that has only 3 elements cannot be reliably inferred to be a statistically significant exception, and must be discounted. The co-occurrence matrix on the right is an example of a dense cluster—a cluster of individuals for which all values of the co-occurrence matrix are 1.

(2) Remove Aggregated Clusters. One of the consequences of the way in which the N-Algorithm works is the possibility that a set of persons whose patterns of associations satisfying the criteria for column sums will comprise a combination of smaller, more tightly associated clusters. This phenomenon is illustrated in FIG. 5, which shows such a result, both as it might be originally manifested in $M_A[R_i,R_i]$ for some $R_i$ in CCS, and the obvious explanation, evinced when the rows and columns of $M_A[R_i,R_i]$ are rearranged. As illustrated there, what happened was that the person indexed in P by 112, (JX[1]) had direct associations with persons in two different clusters, each of which was large enough to drive all column sums above the threshold value of 4 for a 9×9 sub co-occurrence matrix. As apparent from the rearrangement, the result should be disaggregated to replace $R = \{112, 292, 387, 492, 503, 512, 713, 781, 947\}$ with $R_a = \{112, 387, 492, 713, 781\}$ and $R_b = \{112, 292, 503, 512, 947\}$, Since the column sum threshold increases with the size of the matrix, the fact that the column sums for $R_a$ and $R_b$ all satisfy the threshold for a larger matrix assures that both are already in the CCS, so it suffices merely to eliminate R.

There are many alternatives for identifying the elements of CCS that should be excised because they are aggregates of smaller sub co-occurrence matrices. One recourse for example, would be direct inspection of sub co-occurrence matrices after they have been reorganized as illustrated in FIG. 5 to support ready detection of aggregated clusters. Another approach would be to implement a simple utility for post-processing the CCS to identify and eliminate aggregated clusters.

Alternatively the removal of aggregated elements of CCS can be effected automatically in the N-Algorithm by assigning values greater than 0.90 to the density parameter, ρ This density parameter is the only value that must be specified to configure application of the N-Algorithm. Its use in controlling outputs is seen as follows:

(a) The density, d[S] of a sub co-occurrence matrix defined by a set of indices, S, is calculated by setting:

$$d[S] = (\text{number of 1's in } M_A[S,S])/n^2, \quad (E-5)$$

where n is the number of elements of S.

(b) Once the initial set of elements of CCS has been determined, the candidate selection process is re-applied, using, instead of all row indices in $M_A$, only those indices that occur in some element R in CCS. This re-application of the selection process for the set of indices, R, representing a significant cluster is executed for as follows:

(i) Each index, $x \in R$, is processed as a start point, by: finding direct associates of x, DA[x]; and analyzing column sums of the sub co-occurrence matrix $M_A$[DA

[x], DA[x]] to reduce DA[x] as detailed in (1)-(3) in the description of Step 3 to produce a new candidate set depending on R.

(ii) The resultant candidate set from (i) is then ordered in ascending order of the number of elements to produce a set CS={$R_i$} in which i≦j implies the number of elements in $R_i$ is less than or equal to the number of elements in (iii) The members are then run in order to build up a single representative $R_0$ from CS. This is accomplished by beginning with $R_0(1)$ set equal to $R_1$, the smallest member of CS, and successively testing $M_A[(R_0(i) \cup R_{i+1}), (R_0(i) \cup R_{i+1})]$ column sums to add elements to $R_0(i+1)$.

The process (i)-(iii) is run for every member of the CCS produced from the initial search for candidate clusters. It is controlled by the condition that the search for $R_o$ will terminate with the last member of each CS, or until calculation of d as shown in (E-5) shows:

$$d[R_0(i+1)] < (\rho)(d[R_0(i)]),$$

in which case the representative returned is $R_0(i)$. This test allows the user of the N-Algorithm to specify values of the density parameter ρ that will determine whether aggregated members is included or excluded from the output. Specification of values of ρ greater than 0.90, for example, will eliminate all aggregated clusters like that shown in FIG. 5, except possibly for those occurring when one of the aggregated members is very large and the other is very small. Setting ρ=0 will result in outputs containing all aggregated clusters whose column sums pass the statistical tests, but may also omit some of the smaller clusters captured in those aggregations.

Figure 6:
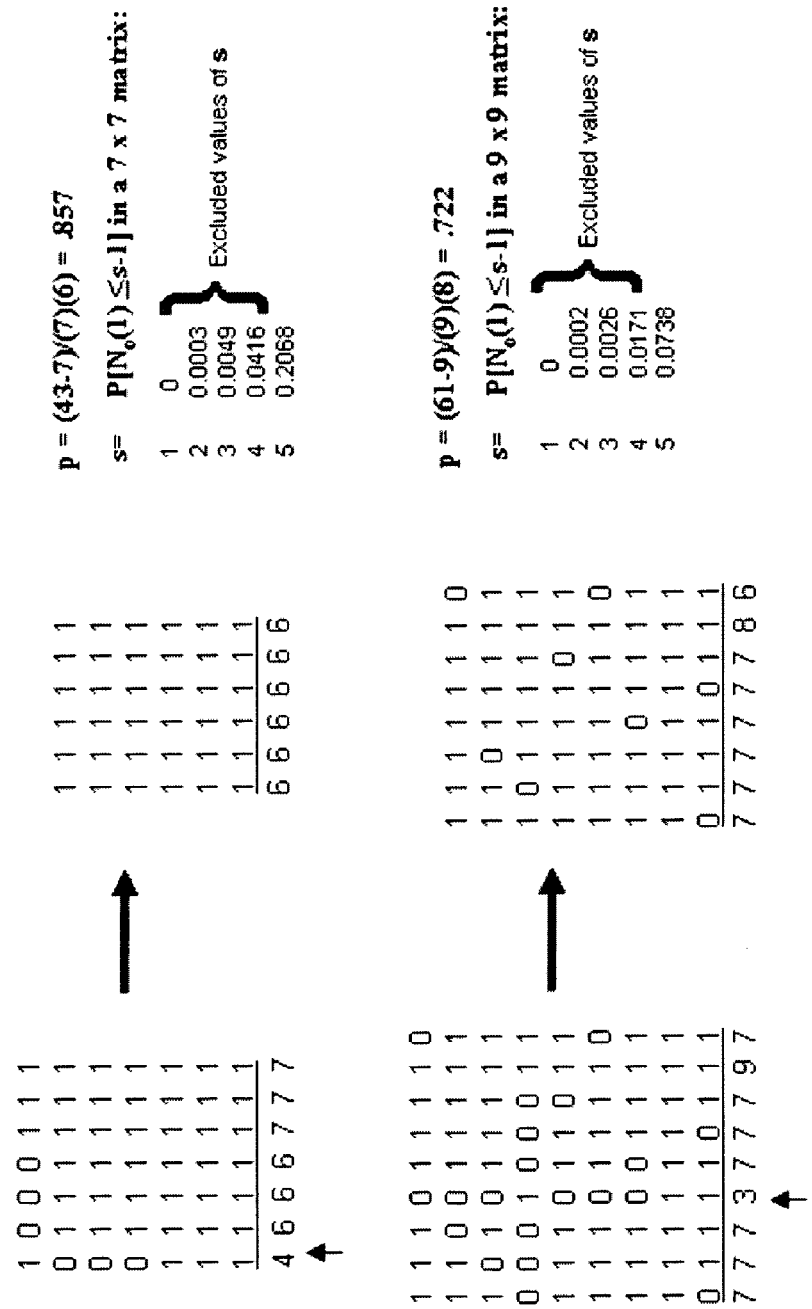
FIG. 6 is a chart illustrating anomalies which may typically be encountered by one embodiment of the present invention.

(3) Trim Members of CCS. The results from (2) when the N-Algorithm is run with a high value of ρ comprise a revised CCS with very few, if any, aggregated clusters. However, since clusters of three persons or fewer were excluded before the elimination of the aggregated clusters, the resultant CCS may still contain clusters whose sub co-occurrence matrices exhibit questionable results. FIG. 6 displays typical anomalies of this kind. In those examples the column sums of the sub co-occurrence matrices all satisfy the criteria for statistical significance, but also exhibit large disparities in the actual values. In other applications, it might be appropriate to accept elements like this as identifying persons who are possibly casual or infrequent participants in group activities. However, when using the N-Algorithm to support evaluation of a GDT, the desired result is a set of clusters of persons whose pattern of associations manifested in $M_A$ unquestionably implies that they should appear together in one of the groups delineated by the tool. This means that trimming such clusters in the manner suggested in FIG. 6 enhances the reliability of CCS as the basis for such testing without degrading its utility. The results shown there were obtained by application of the following process.

(a) Let M be an n×n sub co-occurrence matrix generated by a set R. Calculate, p, the probability of occurrence of an off-diagonal value=1 by setting:

$p=$[(no. of elements of $M=1$)$-n$]/$(n)(n-1)$.

(b) From p calculate $P[N_O(1) \leq a]$, the probability that $N_O(1)$, the number of off-diagonal elements equal to 1, is less than or equal to a, by setting:

$$P[N_O(1) \leq a] = \sum_{i=0}^{a} \binom{n-1}{i} p^i (1-p)^{n-i-1}. \quad \text{(E-6)}$$

(c) Excise from R any element for which $P[N_O(1) \leq s-1]$ for the associated column sum, s, is less than 0.05.

(4) Eliminate Duplicates in CCS. The final step in adjusting CCS is to excise duplicates, to ensure that the final candidate cluster set to be used for evaluation of GDTs contains no different indices, i and j, for which $R_i = R_j$.

In another embodiment of the invention, the test statistic for the N-Algorithm is selected to be the size of the largest dense cluster to which any member of the population P belongs. This statistic is produced by examining in turn each member of the population, as follows:

Let IX={i=1, ..., Np} represent a set of indices for the observed population, P.

Then for each index, i∈IX:

(1) Determine, as before, the set of indices JX={j: $M_A[i,j]=1$}.
(2) Extract the sub-co-occurrence matrix $M_A[JX,JX]$.
(3) Reduce JX by removing at least one of the indices for persons for which the associated column in $M_A[JX,JX]$ has the most zero values.
(4) Re-calculate $M_A[JX',JX']$ for the set JX' which results from the reduction in step (3), and continue the reduction process in step (3) until the result $M_A[JX',JX']$ comprises all 1s, at which point the set of persons whose indices appear in JX' comprise a dense cluster.

The size collection of dense clusters identified in this way is then analyzed to estimate the probability $p_N$, that the largest dense cluster to which a person in the population P belongs contains N or more individuals. The CCS is then selected to comprise all dense clusters discovered the process above that contain N or more individuals for the threshold value N for which $p_N < 0.001$, or some other threshold value chosen by the user to represent a rare event.

In yet other embodiments of the invention the test statistic for the N-Algorithm is selected to be the size of the largest cluster whose sub-co-occurrence matrix contains a specified number of 0s to which each member of the population P belongs. In these embodiments, the number of 0s may be set to a fixed value for all sizes of sub-co-occurrence matrices or a proportional value determined by the size of the sub-co-occurrence matrix.

Applications

Evaluation of GDTs

As described earlier, the principal motivation for development of the N-Algorithm was the need for a viable means of assessing the efficacy of GDTs when there is no information on known groups in the observed population. To this end, the N-Algorithm uses statistics embodied in the association data, A, to produce clusters of members of the observed population whose pattern of associations are virtually certain not to be attributable to chance. The ability to identify such clusters then supports evaluation of GDTs predicated on two premises:

(1) Any member, $R_i$, of the CCS produced by the N-Algorithm applied to a set of associations, A, represents a set of persons who should be found together when one of them appears in a group delineated by a GDT operating on a set of links that includes A; and
(2) The reliability and accuracy of a GDT can therefore be gauged by the extent to which the members of the corresponding CCS are preserved among the groups it generates.

The generic measure of fidelity of a GDT based on the evaluative concept in (2) above is, then, the extent to which members in the CCS={$R_i$: i=1, ..., nc} are preserved among the sets {$G_j$: j=1, ..., ng} generated by the GDT. The basic data for quantifying this measure are the proportions defined for each $R_i$ and $G_j$ by the ratio:

$$P_{ij} = \|R_i \cap G_j\|/\|R_i\| \tag{E-6}$$

where $\|X\|$ denotes "the number of elements in the set X".

Since an element $R_i$ of CCS can be considered to be perfectly preserved under the application of the GDT only when $R_i = R_i \cap G_j$ for any j for which $R_i \cap G_j$ is not empty, the CCS dispersion characteristics for a GDT is perfect only when $P_{ij}$ the N-Algorithm, with the results shown in Table III. The data in the top of Table III were then converted to those shown at the bottom, and plotted to produce the graphs shown in FIG. 3. Results like these suggest that GDT A is the most reliable of the three tools from the perspective of delineating groups, but is likely not to be robust enough to find all groups whose presence is suggested by the association data, while the groups identified by GDT C are likely to contain a much higher incidence of mis-characterization of group membership.

TABLE III

Summary of Results of Evaluation of Results from Three Different Group Detection Tools

| $\|R_i\|$ | i= | GDT A | | GDT B | | | | | GDT C | | | | | |
|---|---|---|---|---|---|---|---|---|---|---|---|---|---|---|
| 4 | 1 | — 0 | x | 4 1.0 | | | | 1.0 | 4 1.0 | 3 .75 | 3 .75 | | | .83 |
| 4 | 2 | 4 1.0 | 1.0 | 4 1.0 | | | | 1.0 | 4 1.0 | | | | | 1.0 |
| 10 | 3 | 10 1.0 | 1.0 | 10 1.0 | | | | 1.0 | 10 1.0 | | | | | 1.0 |
| 10 | 4 | 10 1.0 | 1.0 | 8 .80 | 8 .80 | 7 .70 | 7 .70 | .75 | 10 1.0 | 5 .50 | 4 .40 | 4 .40 | 4 .40 | 3 .30 | .50 |
| 10 | 5 | 9 .90 | .90 | 9 .90 | 8 .85 | | | .88 | 10 1.0 | 7 .70 | 3 .30 | 3 .30 | 3 .30 | | .52 |
| 11 | 6 | 11 1.0 | 1.0 | 11 1.0 | | | | 1.0 | 11 1.0 | | | | | | 1.0 |
| 4 | 7 | — 0 | x | 3 .75 | 3 .75 | | | .75 | 4 1.0 | | | | | | 1.0 |
| 4 | 8 | 4 1.0 | 1.0 | 4 1.0 | | | | 1.0 | 4 1.0 | | | | | | 1.0 |
| 4 | 9 | 4 1.0 | 1.0 | 4 1.0 | | | | 1.0 | 4 1.0 | | | | | | 1.0 |

| $P_{ij}$ Values $\geq$ | GDT A | | GDT B | | GDT C | |
|---|---|---|---|---|---|---|
| | No. | Prop. | No. | Prop. | No. | Prop. |
| 1.0 | 6 | 0.86 | 6 | 0.35 | 5 | 0.33 |
| .90 | 7 | 1.0 | 7 | 0.41 | 5 | 0.33 |
| .80 | | | 10 | 0.59 | 5 | 0.33 |
| .75 | | | 15 | 0.88 | 10 | 0.67 |
| .70 | | | 17 | 1.0 | 10 | 0.67 |
| .60 | | | | | 10 | 0.67 |
| .50 | | | | | 11 | 0.73 |
| .40 | | | | | 14 | 0.93 |
| .30 | | | | | 15 | 1.0 | is 0 or 1 for all values of i and j. This observation justifies the quantification of fidelity of a GDT by PI[$R_i$], the preservation index for $R_i$ under the GDT, which is calculated by defining {$P_k[R_i]$: k=1, ..., np} to be the set of $P_{ij}$ values derived when $\|R_i \cap G_j\| \geq 3$ and setting:

$$PI[R_i] = (1/np) \sum_{k=1}^{np} P_k[R_i] \tag{E-7}$$

A more detailed characterization for comparing the fidelity of two GDTs can be obtained by displaying the proportion of $P_k[R_i]$ values that are greater than or equal to x in a graph on which the x-axis values run from x=1 to 0, and the y-axis shows the associated values of $P_k[R_i]$.

Figure 7:
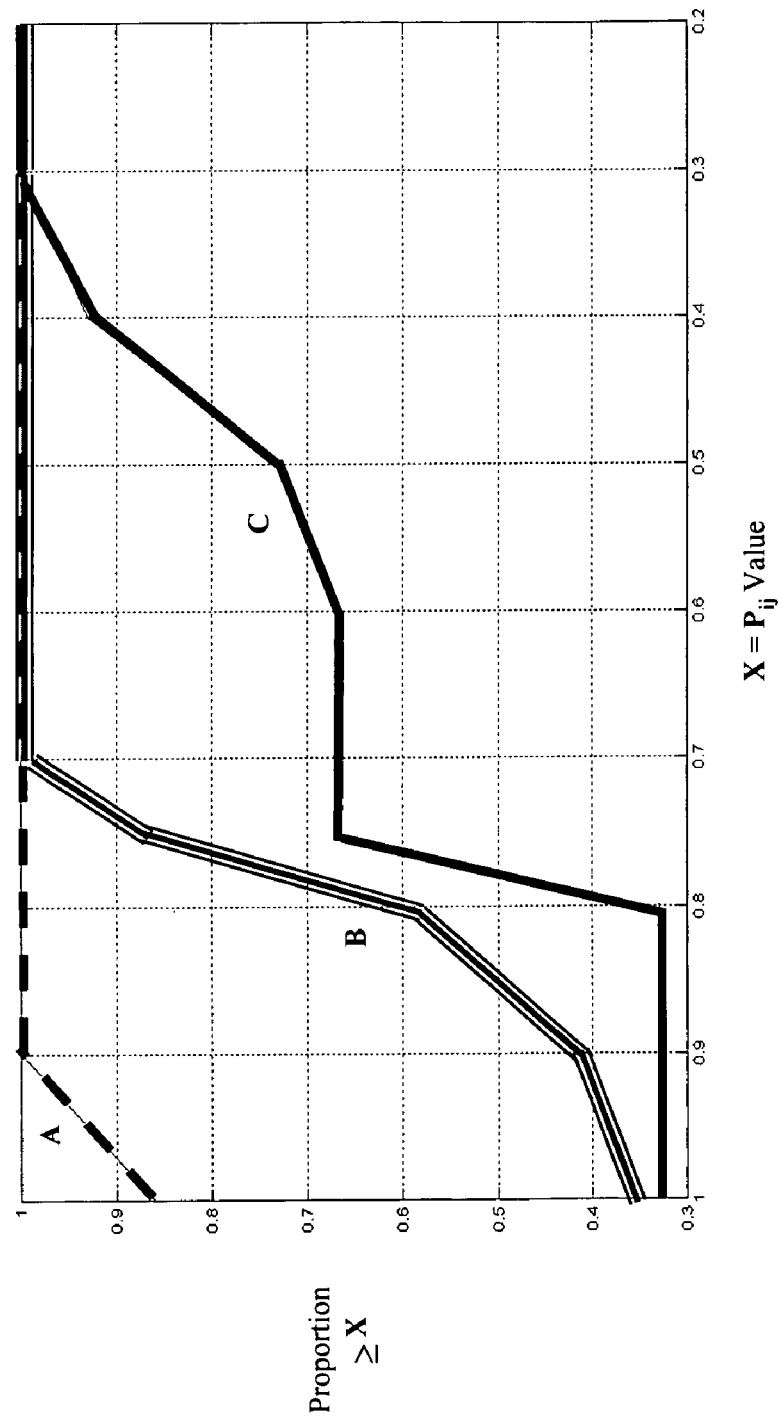
FIG. 7 is a graph illustrating the fidelity of three GDTs in one embodiment of the present invention.

The quantification of the fidelity of GDTs in the ways just described is illustrated in Table III and FIG. 7. As shown there, the N-Algorithm and three group detection tools were applied to the same association data. The preservation indices were then calculated as described in (E-7) from the comparisons of the results from the GDTs with the CCS produced by System Architecture Various systems in accordance with the present invention may be constructed. Such systems may include server devices communicating over various networks, such as the Internet. The network may also comprise an intranet, a Local Area Network (LAN), a telephone network, or a combination of suitable networks. The devices may connect to the network through wired, wireless, or optical connections.

A server device includes contains a processor coupled to a computer-readable medium. The memory comprises applications, such as an application implementing an embodiment of the present invention. A server device may comprise a combination of several software programs and/or hardware configurations. While the description describes processes that may be implemented in program code, they may be implemented as special purpose processors, or combinations of special purpose processors and program code as well.

Server devices may be implemented as a network of computer processors. Examples of server devices and network appliances are a server, mainframe computer, networked computer, or other processor-based devices, and similar types of systems and devices. Processors used by these devices can be any of a number of computer processors, such as processors from Intel Corporation of Santa Clara, Calif. and Motorola Corporation of Schaumburg, Ill.

Such processors may include a microprocessor, an ASIC, and state machines. Such processors include, or may be in communication with computer-readable media, which stores program code or instructions that, when executed by the processor, cause the processor to perform actions. Embodiments of computer-readable media include, but are not limited to, an electronic, optical, magnetic, or other storage or transmission device capable of providing a processor, such as the processor 114 of server device 104, with computer-readable instructions. Other examples of suitable media include, but are not limited to, a floppy disk, CD-ROM, DVD, magnetic disk, memory chip, ROM, RAM, an ASIC, a configured processor, optical media, magnetic tape media, or any other suitable medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, Visual Basic, Java, Python, Perl, and JavaScript.

It should be noted that the present invention may comprise systems having a different architecture than that which is described above.

General

The foregoing description of the embodiments of the invention has been presented only for the purpose of illustration and description and is not intended to be exhaustive or to limit the invention to the precise forms disclosed. Numerous modifications and adaptations thereof are apparent to those skilled in the art without departing from the spirit and scope of the present invention.

That which is claimed:

1. A method of evaluating a group detection tool without knowledge regarding a composition of real-world groups to which individuals in an observed population belong, comprising:
    receiving, using a microprocessor, a set of data comprising a collection of asserted links between pairs of individuals;
    creating, using the microprocessor, a list of the individuals present in the collection of asserted links, each individual on the list being assigned a unique numerical identifier;
    creating, using the microprocessor, a square co-occurrence matrix describing the collection of asserted links, the square co-occurrence matrix comprising a plurality of rows and a plurality of columns each containing the list of individuals;
    inserting, using the microprocessor, a link indicator in each cell of the square co-occurrence matrix, the link indicator having a first value if a first individual associated with the row and a second individual associated with the column are linked and a second value if they are not;
    identifying, using the microprocessor, a plurality of square sub-co-occurrence matrices in the square co-occurrence matrix;
    generating, using the microprocessor, a statistic for a characteristic of at least one class of the plurality of square sub-co-occurrence matrices;
    identifying, using the microprocessor, one of the plurality of sub-co-occurrence matrices for each of the at least one class of square sub-co-occurrence matrices; and
    evaluating, using the microprocessor, the performance of the group detection tool by:
        applying the group detection tool to the set of data, and determining the extent to which a plurality of individuals in the at least one square sub-co-occurrence matrix are associated in one or more groups generated by the group detection tool.

2. The method of claim 1, further comprising determining a link between a pair of individuals, the link implying both the ability and likelihood of exchange of information between the pair of individuals.

3. The method of claim 1, wherein the class of sub-co-occurrence matrices comprises square a plurality of sub-co-occurrence matrices of size N×N for at least one value of N greater than 3.

4. The method of claim 3, wherein the statistic for each of the at least one class of sub-co-occurrence matrices is the sum of link indicators having the first value in each of the columns of the sub-co-occurrence matrices in the class.

5. The method of claim 4, further comprising determining that a pair of individuals is associated if the sum of the link indicators having the first value exceeds a threshold value.

6. The method of claim 5, wherein the threshold value comprises a first threshold value and further comprising determining the first threshold value having a probability of occurrence less than a second threshold value.

7. The method of claim 5, further comprising determining the threshold value by:
    determining a first sum of link indicators in sub-co-occurrence matrices having fewer elements than in the sub-co-occurrence matrix;
    determining a second sum of link indicators in sub-co-occurrence matrices having more elements than in the sub-co-occurrence matrix; and
    setting the threshold value between the first sum and the second sum.

8. The method of claim 5, further comprising creating a candidate cluster set comprising all pairs of individuals for which the sum of the link indicators having the first value exceeds the threshold value.

9. The method of claim 8, further comprising adjusting the candidate cluster set.

10. The method of claim 9, wherein adjusting the candidate cluster set comprises removing any clusters comprising 3 or fewer members from the candidate cluster set.

11. The method of claim 9, wherein adjusting the candidate cluster set comprises removing aggregate clusters from the candidate cluster set.

12. The method of claim 1, wherein the at least one class comprises a plurality of classes of the same size.

13. The method of claim 12, wherein the statistic comprises the sum of link indicators having the second value in each of the columns of the sub-co-occurrence matrices in the class.

14. The method of claim 13, further comprising creating of a candidate cluster set comprising all pairs of individuals for which the sum of the link indicators having the second value is below a threshold value.

15. The method of claim 14, wherein the threshold value is 0.

16. The method of claim 1, wherein the first value comprises a "1" and the second value comprises a "0."

17. The method of claim 1, wherein the link indicator comprises the first value if the first individual and the second individual are the same.

18. A non-transitory computer-readable storage medium with an executable program stored thereon, wherein the program instructs a microprocessor to perform the following steps for evaluating a group detection tool without knowledge regarding a composition of real-world groups to which individuals in an observed population belong:

receiving a set of data comprising a collection of asserted links between pairs of individuals;

creating a list of the individuals present in the collection of asserted links, each individual on the list being assigned a unique numerical identifier creating a square co-occurrence matrix describing the collection of asserted links, the square co-occurrence matrix comprising a plurality of rows and a plurality of columns each containing the list of individuals;

inserting a link indicator in each cell of the square co-occurrence matrix, the link indicator having a first value if a first individual associated with the row and a second individual associated with the column are linked and a second value if they are not;

identifying a plurality of square sub-co-occurrence matrices in the square co-occurrence matrix;

generating a statistic for a characteristic of at least one class of the plurality of square sub-co-occurrence matrices;

identifying one of the plurality of sub-co-occurrence matrices for each of the at least one class of square sub-co-occurrence matrices; and evaluating the performance of the group detection tool by:
applying the group detection tool to the set of data, and
determining the extent to which a plurality of individuals in the at least one square sub-co-occurrence matrix are associated in one or more groups generated by the group detection tool.

19. The non-transitory computer-readable storage medium of claim 18, further comprising program code for determining a link between a pair of individuals, the link implying both the ability and likelihood of exchange of information between the pair of individuals.

20. The non-transitory computer-readable storage medium of claim 18, wherein the class of sub-co-occurrence matrices comprises square a plurality of sub-co-occurrence matrices of size N×N for at least one value of N greater than 3.

21. The non-transitory computer-readable storage medium of claim 20, wherein the statistic for each of the at least one class of sub-co-occurrence matrices is the sum of link indicators having the first value in each of the columns of the sub-co-occurrence matrices in the class.

22. The non-transitory computer-readable storage medium of claim 21, further comprising program code for determining that a pair of individuals is associated if the sum of the link indicators having the first value exceeds a threshold value.

23. The non-transitory computer-readable storage medium of claim 22, further comprising program code for determining the threshold value by:
determining a first sum of link indicators in sub-co-occurrence matrices having fewer elements than in the sub-co-occurrence matrix;
determining a second sum of link indicators in sub-co-occurrence matrices having more elements than in the sub-co-occurrence matrix; and
setting the threshold value between the first sum and the second sum.

24. The non-transitory computer-readable storage medium of claim 22, further comprising program code for creating a candidate cluster set comprising all pairs of individuals for which the sum of the link indicators having the first value exceeds the threshold value.

25. The non-transitory computer-readable storage medium of claim 24, further comprising program code for adjusting the candidate cluster set.

26. The non-transitory computer-readable storage medium of claim 24, wherein program code for adjusting the candidate cluster set comprises program code for removing any clusters comprising 3 or fewer members from the candidate cluster set.

27. The non-transitory computer-readable storage medium of claim 25, wherein program code for adjusting the candidate cluster set comprises program code for removing aggregate clusters from the candidate cluster set.

28. The non-transitory computer-readable storage medium of claim 18, wherein the at least one class comprises a plurality of classes of the same size.

29. The non-transitory computer-readable storage medium of claim 28, wherein the statistic comprises the sum of link indicators having the second value in each of the columns of the sub-co-occurrence matrices in the class.

30. The non-transitory computer-readable storage medium of claim 29, further comprising program code for creating a candidate cluster set comprising all pairs of individuals for which the sum of the link indicators having the second value is below a threshold value.

* * * * *